US010437704B2

(12) United States Patent
Singh et al.

(10) Patent No.: US 10,437,704 B2
(45) Date of Patent: Oct. 8, 2019

(54) IDENTIFYING BACK-END COMPONENTS BASED ON STACK TRACES

(71) Applicant: CA, Inc., New York, NY (US)

(72) Inventors: Karmjit Singh, Fremont, CA (US); Ramesh Mani, Fremont, CA (US); Martin Tali, Foster City, CA (US)

(73) Assignee: CA, Inc., New York, NY (US)

( * ) Notice: Subject to any disclaimer, the term of this patent is extended or adjusted under 35 U.S.C. 154(b) by 157 days.

(21) Appl. No.: 15/358,425

(22) Filed: Nov. 22, 2016

(65) Prior Publication Data
US 2018/0143894 A1 May 24, 2018

(51) Int. Cl.
*G06F 11/00* (2006.01)
*G06F 11/36* (2006.01)

(52) U.S. Cl.
CPC ...... *G06F 11/3636* (2013.01); *G06F 11/3664* (2013.01)

(58) Field of Classification Search
CPC .............. G06F 11/302; G06F 11/3048; G06F 11/3072; G06F 11/3466; G06F 11/3476; G06F 11/3419; G06F 11/3636; G06F 11/3664
See application file for complete search history.

(56) References Cited

U.S. PATENT DOCUMENTS

| | | | | |
|---|---|---|---|---|
| 5,873,075 A * | 2/1999 | Cochrane | .......... | G06F 17/30371 |
| 8,327,377 B2 * | 12/2012 | Krishnamurthy | ... | G06F 11/3495 717/104 |
| 8,438,427 B2 * | 5/2013 | Beck | ..................... | G06F 11/323 714/46 |
| 8,473,925 B2 * | 6/2013 | Gagliardi | ............ | G06F 11/3644 714/35 |
| 8,527,960 B2 * | 9/2013 | Schmelter | ........... | G06F 11/3636 717/128 |
| 9,021,448 B1 * | 4/2015 | Gagliardi | .................. | G06F 8/70 717/128 |
| 9,323,645 B2 * | 4/2016 | Michelsen | .......... | G06F 11/3688 |
| 2004/0078691 A1 * | 4/2004 | Cirne | .................. | G06F 11/3624 714/38.13 |
| 2008/0109684 A1 | 5/2008 | Addleman et al. | | |
| 2008/0126413 A1 | 5/2008 | Addleman et al. | | |
| 2010/0281488 A1 | 11/2010 | Krishnamurthy et al. | | |
| 2012/0102488 A1 | 4/2012 | Wintergerst et al. | | |
| 2012/0259793 A1 * | 10/2012 | Umansky | ............... | G06Q 10/06 705/348 |
| 2012/0260236 A1 * | 10/2012 | Basak | .................. | G06F 11/323 717/132 |

(Continued)

*Primary Examiner* — Elmira Mehrmanesh
(74) *Attorney, Agent, or Firm* — Meyertons, Hood, Kivlin, Kowert & Goetzel, P.C.

(57) ABSTRACT

In various embodiments, a method of automatically identifying back-end components of a processing system may be performed. The method may include logging socket communications as a plurality of stack traces. The method may further include filtering the plurality of stack traces to identify a transaction from a particular thread, where the transaction includes a write stack trace and a read stack trace. The method may further include identifying, based on an examination of common stack elements between the write stack trace and the read stack trace, a candidate software component as a back-end component that is communicating with an external software component.

18 Claims, 7 Drawing Sheets

(56) References Cited

U.S. PATENT DOCUMENTS

2013/0111067 A1* 5/2013 Cobb .................. G06F 11/3447
  709/247
2014/0108463 A1* 4/2014 Gagliardi ............ G06F 11/3495
  707/797
2016/0124780 A1 5/2016 Scheerer et al.

* cited by examiner

*Merged Stack Trace*
406

| SocketOutputStream.write |
| APSIHighPerformanceNew.write |
| BufferedOutputStream.flushBuffer |
| BufferedOutputStream.flush |
| MysqlIO.send |

*Mismatch* ↔

| SocketInputStream.read |
| APSIHighPerformanceNew.read |
| ReadAheadInputStream.fill |
| ReadAheadInputStream.readFromUnderlyi |
| ReadAheadInputStream.read |
| MysqlIO.readFully |
| MysqlIO.reuseAndReadPacket |
| MysqlIO.checkErrorPacket |

| MysqlIO.proxy_3448 |
| MysqlIO.sendCommand |
| MysqlIO.sqlQueryDirect |
| ConnectionImpl.execSQL |
| PreparedStatement.executeInternalQuer |
| PreparedStatement.executeQuery |
| NewProxyPreparedStatement.ExecuteQue |
| Accounts.fetch |
| Accounts.get |
| Accountservice.login |
| ServletContainer.service |
| ThreadpoolExecutor$Worker.run |
| TaskThread$WrappingRunnable.run |
| Thread.run |

*FIG. 4B*

IDENTIFYING BACK-END COMPONENTS BASED ON STACK TRACES

BACKGROUND

Technical Field

This disclosure relates generally to detection and monitoring of software component behavior and more specifically to a back-end component identification system.

Description of the Related Art

Computer systems often include many software applications operating simultaneously. In some cases, these software applications may be collections of software components that each perform individual tasks or portions of individual tasks. Some software components may be back-end components that communicate with one or more external systems. Application errors or delays may potentially manifest in one or more software components. It may be important to monitor performance of back-end components to determine whether errors or delays are being caused by the one or more external systems, rather than the software components themselves.

Application performance management (APM) systems may be used to monitor performance of software components. However, it may be difficult to identify software components as being back-end components. In particular, many APM systems may identify back-end components requesting application information, system information, or both from application providers, users, or both. Such procedures for identifying back-end components may take an undesirable amount of time and may provide a frustrating experience for the application providers, the users, or both. Further, results of these procedures may become stale as new versions of applications are released, system components (e.g., hardware or software) are added or modified, or both. When the results become stale, the APM systems may need to repeat the back-end component identification process.

SUMMARY

In various embodiments, a back-end component identification system is disclosed that logs socket communications to generate a plurality of stack traces. At least some of the socket communications may be part of transactions between of one or more threads of one or more monitored applications and one or more external processes. At least some of the plurality of stack traces may include a write stack trace and a read stack trace. The back-end component identification system may filter the plurality of stack traces to identify transactions that include a write stack trace and a read stack trace. The back-end component identification system may automatically examine common stack elements between the write stack trace and the read stack trace. Based on examining the stack elements, the back-end component identification system may automatically identify at least one candidate software component as a back-end component that is communicating with a software component external to the particular thread.

Accordingly, the back-end component identification system may automatically identify software components as back-end components. The process of automatically may, in some cases, be performed more quickly, as compared to a process of identifying back-end components using application or system information received from application providers, users, or both. In some cases, the back-end components may be more closely monitored, as compared to at least some other software components. For example, an expected timing of execution of at least one process of the software components may be determined. As a result, if an error occurs, the system may more easily, as compared to a system that did not identify software components as back-end components, determine whether an external system is causing the error.

BRIEF DESCRIPTION OF THE DRAWINGS

FIGS. 4A-B are block diagrams illustrating one embodiment of a process of identifying a software component as a back-end component.

Figure 1:
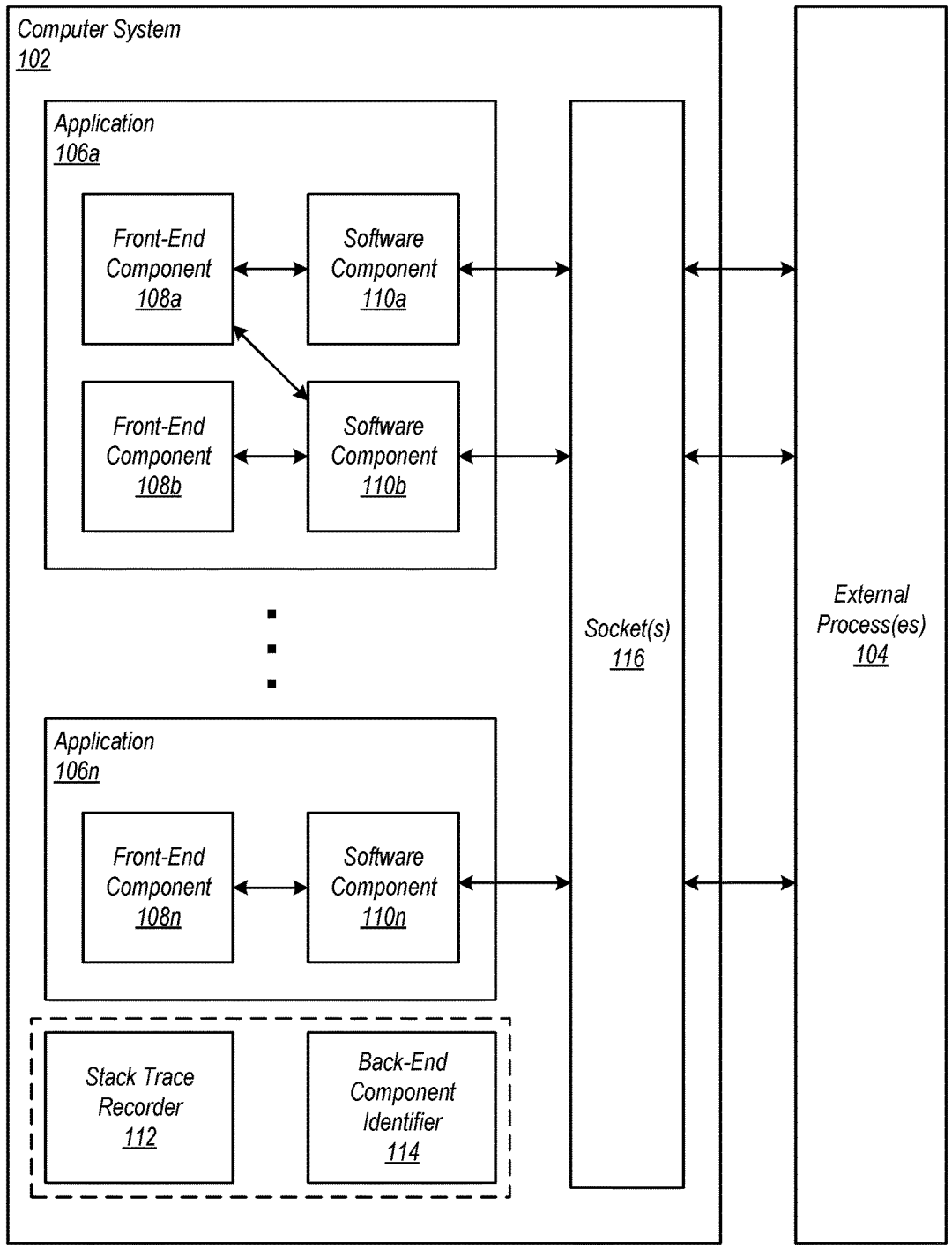
FIG. 1 is a block diagram illustrating one embodiment of a computer system that includes a back-end component identification system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. s phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a computer system that runs six applications, the terms "first application" and "second application" can be used to refer to any two of the six applications, and not, for example, just a first two applications to be started.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A back-end component identification system is disclosed herein that automatically identifies software components as being back-end components. In particular, socket communications of threads of a plurality of monitored applications may be logged to generate a plurality of stack traces. The plurality of stack traces may be filtered to identify threads performing transactions that include a write stack trace (e.g., a stack trace including a write operation) and a read stack trace (e.g., a stack trace including a read operation). Software components of the write stack trace and the read stack trace may be analyzed and a particular software component (a candidate software component) that is identified by both the write stack trace and the read stack trace may be identified as a back-end component. In some cases, the candidate software component may correspond to a closest common ancestor stack element of both the write stack trace and the read stack trace. In other cases, the candidate software component may correspond to be a stack element prior to the closest common ancestor stack element (e.g., because the software component corresponding to the closest common ancestor stack element failed to satisfy one or more predefined rules). As a result, application performance management (APM) systems that include the back-end component identification system may more easily identify back-end components, as compared to APM systems that identify back-end components by analyzing requested source code of an application provider. Additionally, in some cases, back-end components may be more accurately identified, as compared to other back-end component identification methods.

Subsequent to being identified, the back-end component may be monitored more closely, as compared to one or more other software components of the plurality of monitored applications. Further, errors involving actions performed by an external system associated with the back-end component may be detected more easily, as compared to systems where the candidate software component is not identified as a back-end component. In various embodiments, the errors may include execution failures, execution timing anomalies, or both. In some embodiments, the back-end component identification system may be provided to an application provider. The application provider may provide various monitored applications to one or more users. In some cases, the various monitored applications may be provided to the one or more users as a software suite that includes at least one or more portions of the back-end component identification system. Further, in some embodiments, the application provider may use the back-end component identification system on various applications run by the application provider.

As used herein, a "back-end component" running on a first computer system is one that communicates with one or more processes running on a second, external computer system. Additionally, "back-end component" may refer to a first software component running on a first virtual machine communicating with a second software component. In some cases, the second software component may be running on a second virtual machine. The second software component could be running on a same computing device as the first software component or on a different computing device than the first software component. For example, in some embodiments, the first and second computer systems are connected at least in part by a computer network such as a local area network or the Internet. As another example, in some embodiments, the first and second computer systems are part of the same computing device (e.g., the first and second computer systems are virtual machines run by the same computing device). The first and second computer systems may communicate via a computer network such as a local area network or the internet, via one or more virtual network links, or via one or more internal network links. Software components that perform socket-based communication are examples of back-end components within the context of this disclosure. Back-end components may initiate multiple communications with the second computer system. For example, the back-end components may request that first data be written at the second computer system and subsequently may request that second data be read from the second computer system. In many cases, a back-end component may not complete execution until receiving data, a confirmation message, or both from the second computer system. As another example, the first computer system may be a user device configured to receive a username and the second computer system may be a database system configured to receive the username as part of a write request and to provide an expected password as part of a read request. In response to receiving the expected password, the first computer system may authenticate the user.

This disclosure initially describes, with reference to FIG. 1, various embodiments of a computer system that includes a back-end component identification system. Various embodiments of a stack trace recorder of a back-end component identification system are described with reference to FIG. 2. Various embodiments of a back-end component identifier of a back-end component identification system are described with reference to FIG. 3. An exemplary examination of two stack traces to identify a software component as a back-end component is described with reference to FIGS. 4A-B. A method of automatically identifying at least one back-end component is described with reference to FIG. 5. Finally, an embodiment of a computing system that includes a back-end component identification system is described with reference to FIG. 6.

Turning now to FIG. 1, a simplified block diagram illustrating one embodiment of a computer system 102 that includes a back-end component identification system is shown. In the illustrated embodiment, computer system 102 includes applications 106a-n, stack trace recorder 112, back-end component identifier 114, and sockets 116. Applications 106a-n include one or more front-end components 108a-n and software components 110a-n. To provide context, FIG. 1 further includes external process(es) 104. In the illustrated embodiment, applications 106a-n, stack trace recorder 112, and back-end component identifier 114 all correspond to a same process. In some embodiments, the process may correspond to a single virtual machine. However, in some embodiments, computer system 102 may include multiple processes each including one or more respective applications, stack trace recorders and back-end component identifiers. Additionally, in some embodiments, at least one of applications 106a-n, stack trace recorder 112, or back-end component identifier 114 may correspond to multiple processes or virtual machines.

Computer system 102 may run various applications 106a-n. Applications 106a-n may include respective components. For example, in the illustrated embodiment, application 106a includes front-end components 108a-b and software components 110a-b. In some embodiments, front-end components 108a-b may include various processes used to communicate with a user. For example, front-end component 108a may communicate with a user in response to a uniform resource locator (URL) call. At least some of front-end components 108a-n may communicate with software components 110a-n. At least some of software components 110a-n may be back-end components. As discussed above, back-end components at least send data to an external process as part of a write request and receive data from the external process as part of a read request. In the illustrated embodiment, software components 110a-n may communicate with external processes 104 via socket(s) 116. In various embodiments, socket(s) 116 may be network sockets configured to connect computer system 102 with external processes 104 of one or more external computer systems. To illustrate, in various embodiments, the external system may be a database, a mail server, or a messaging system. Some software components (e.g., software component 110a) may correspond to a single front-end component (e.g., front-end component 108a). In some embodiments, some software components (e.g., software component 110b) may correspond to multiple front-end components (e.g., front-end components 108a-b). In some embodiments, at least one of front-end components 108a-n or various software components 110a-n may correspond to one or more respective threads.

At least some communications by software components 110a-n via socket(s) 116 may be monitored by stack trace recorder 112. As further discussed with reference to FIG. 2, stack trace recorder 112 may log the communications to generate a plurality of stack traces. In various embodiments, the plurality of stack traces may indicate respective threads, respective transactions, or both.

As further discussed with reference to FIG. 3, back-end component identifier 114 may receive the plurality of stack traces and may identify stack traces that indicate potential back-end components (e.g., transactions of a software component that include at least one write operation followed by at least one read operation). As further discussed with reference to FIGS. 4A-4B, back-end component identifier 114 may automatically identify one or more software components as back-end components. In some cases, identifying software components as back-end components may include validating the software components against one or more predefined rules.

Subsequent to being identified as back-end components, a timing of execution of the back-end components may be monitored. As a result, in some cases, errors caused by the back-end components (e.g., timing errors caused by an external system) may be detected. In some embodiments, the back-end component identification system may identify back-end components more quickly and with less information, as compared to at least some other systems that identify back-end components.

Figure 2:
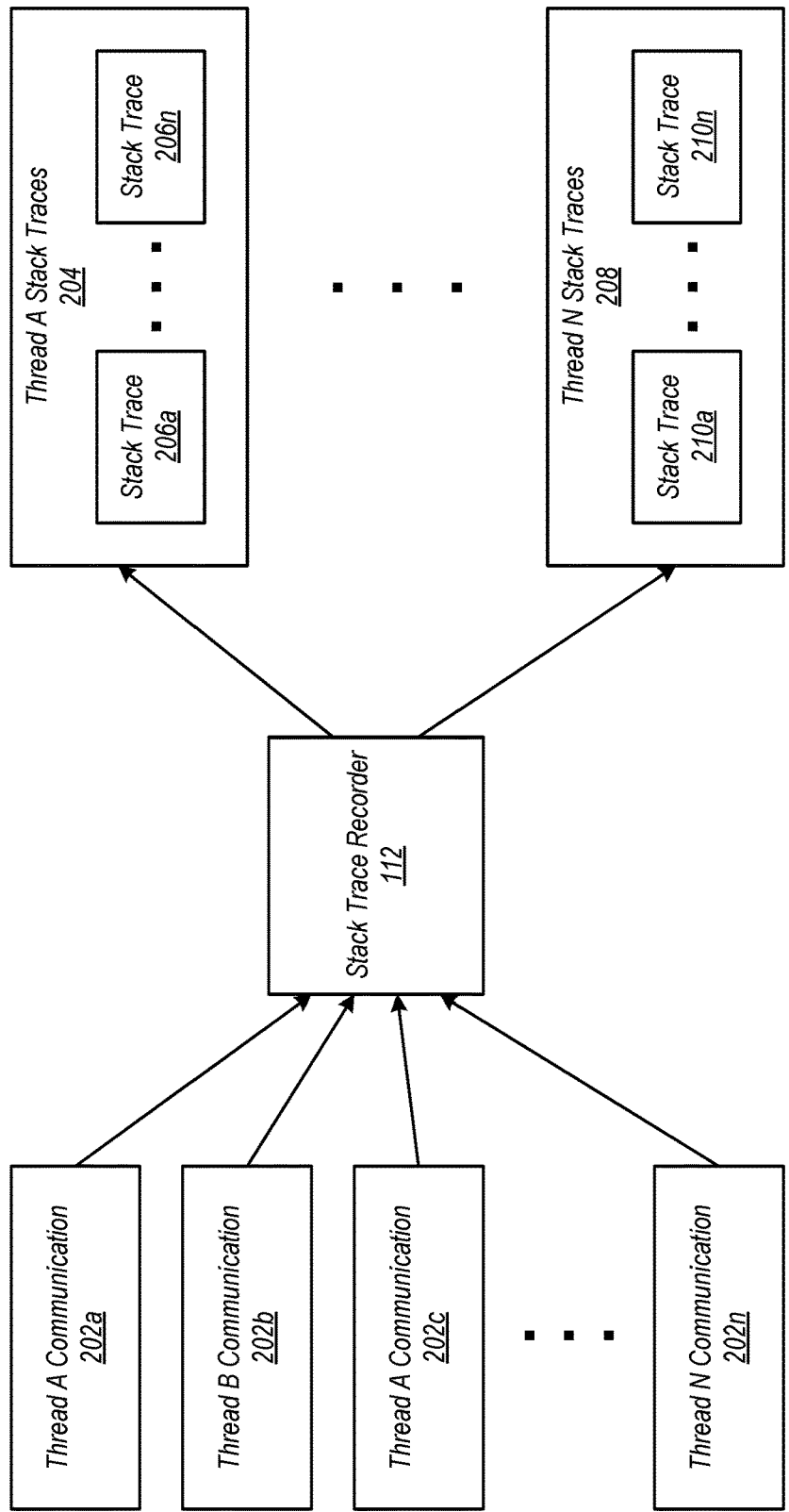
FIG. 2 is a block diagram illustrating one embodiment a stack trace recorder of one embodiment of a back-end component identification system.

Turning now to FIG. 2, a block diagram illustrating an embodiment of a stack trace recorder 112 of a back-end component identification system is shown. As discussed above, stack trace recorder 112 may be part of a larger processing system, such as the system of FIG. 1. However, for clarity's sake, various portions of the system of FIG. 1 are not shown. In the illustrated embodiment, stack trace recorder 112 receives indications of a plurality of communications 202a-n. Communications 202a-n may involve software components 110a-n of FIG. 1. For example, in one embodiment, thread A communication 202a may be a write request from software component 110a to external process 104 and thread A communication 202c may be a read request from software component 110a to external process 104. Based on communications 202a-n, stack trace recorder 112 may log communications 202a-n to generate a plurality of thread stack traces (e.g., thread A stack traces 204 and thread N stack traces 208). For example, stack trace recorder 112 may store stack traces (e.g., data regarding communications 202a-n) in one or more memory devices. In the illustrated embodiment, thread A stack traces 204 and thread N stack traces 208 include stack traces 206a-n and 210a-n, respectively, organized based on originating thread. However, in other embodiments, other methods of organizing stack traces 206a-n and stack traces 210a-n may be used (e.g., based on transaction identifiers, based on communication timing, or another method). In some cases, only a subset of socket communications may be logged. Accordingly, a subset of threads of the monitored applications may be identified and socket communications of the subset may be logged. In some embodiments, the subset may be based on communications that are using the sockets in a client context, as opposed to a server context. In other embodiments, other criteria may be used additionally or instead.

Figure 3:
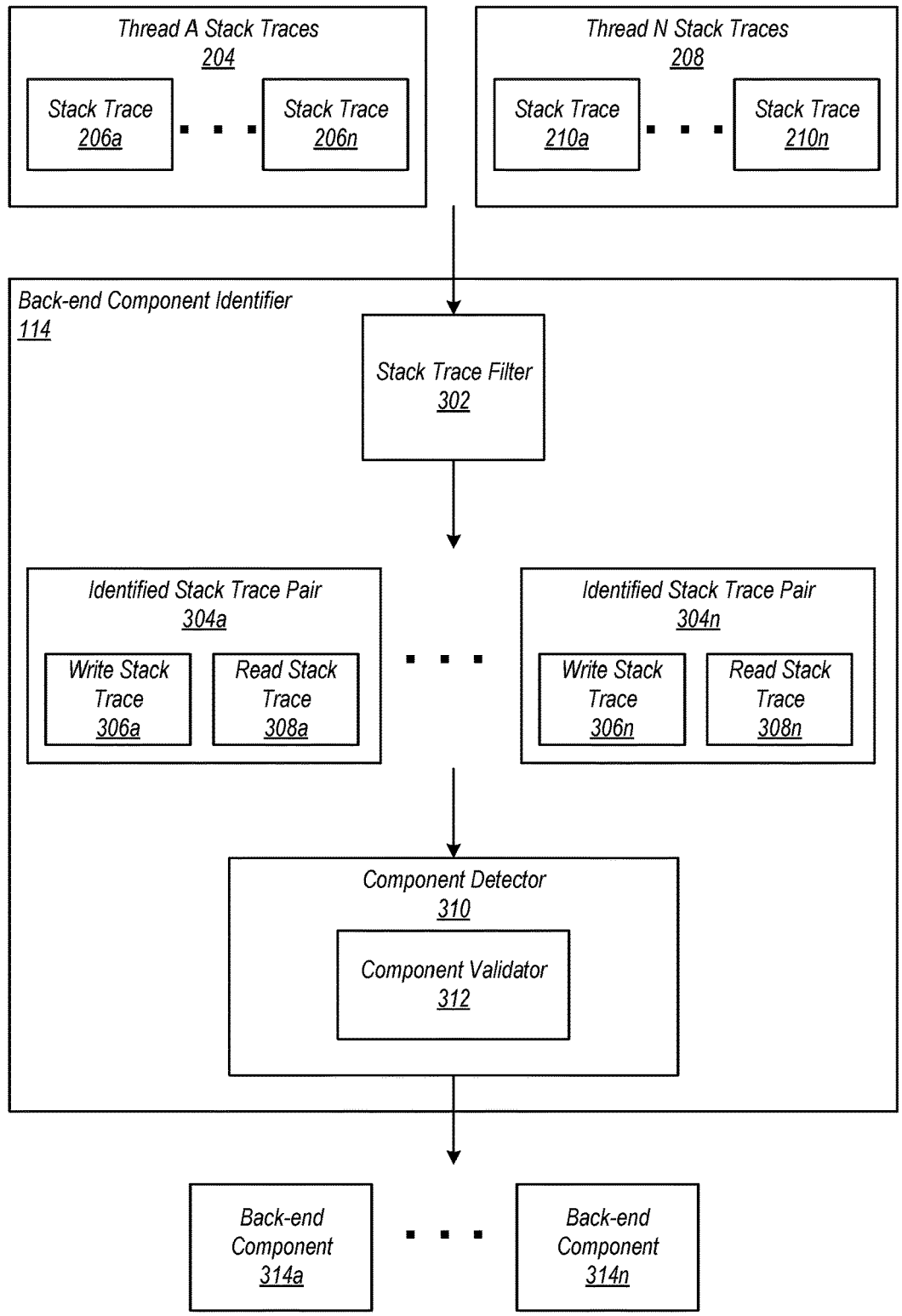
FIG. 3 is a block diagram illustrating one embodiment of a back-end component identifier of a back-end component identification system.

Turning now to FIG. 3, a block diagram illustrating an embodiment of a back-end component identifier 114 is shown. As discussed above, back-end component identifier 114 may be part of a larger processing system, such as the system of FIG. 1. However, for clarity's sake, various portions of the system of FIG. 1 are not shown. In the illustrated embodiment, back-end component identifier 114 includes stack trace filter 302, identified stack trace pairs 304a-n, and component detector 310. Identified stack trace pairs 304a-n include respective write stack traces 306a-n and respective read stack traces 308a-n. Component detector 310 includes component validator 312. Additionally shown are thread stack traces 204 and 208 and back-end components 314a-n.

As discussed above with reference to FIG. 2, stack trace recorder 112 may automatically generate thread stack traces 204 and 208 in response to communications using socket(s) 116. In the illustrated embodiment, back-end component identifier 114 identifies, based on received stack traces (e.g., stack traces 206a-n and 210a-n), candidate software components 314a-n as back-end components.

In particular, stack trace filter 302 may filter the received stack traces to identify transactions that include a stack trace that requests a write operation (a write stack trace) and a stack trace that requests a read operation (a read stack trace). In the illustrated embodiment, stack trace filter 302 may also verify that the write stack trace and the read stack trace were generated from communications of a single thread (e.g., and not two different threads that used the same transaction identifier). Therefore, stack trace filter 302 may identify stack traces that include corresponding transaction identifiers, corresponding thread identifiers, or both. Accordingly, stack trace filter 302 may identify a plurality of identified stack trace pairs 304a-n.

Component detector 310 may receive the identified stack trace pairs 304a-n. As further described below with reference to FIGS. 4A-B, component detector 310 may identify candidate software components, which may correspond to stack elements of both stack traces of respective identified stack trace pairs 304a-n, as back-end components 314a-n. The candidate software components may correspond to a closest common ancestor stack element of both the write stack trace and the read stack trace. Further, in some embodiments, component validator 312 may be used to identify software components as back-end components 314a-n based on one or more predefined rules. The one or more predefined rules may be applied to one or more of the stack elements (e.g., because the stack elements may indicate violations of the one or more predefined rules, such as by having names that indicate automatically or externally generated corresponding software components), to corresponding software components, or any combination thereof. For example, the one or more predefined rules may be used to determine whether one or more of the stack elements indicate that corresponding software components are automatically or externally generated, because, in some cases, one or more source code files for automatically or externally generated software components may not be present. To illustrate, in some cases, the automatically generated source code may be contributed by a proxy application program interface or by a third party (e.g., an external) library, as opposed to one or more portions of the computer system, and may not have corresponding source code files on the computer system. As a result, a program administrator may be unable to identify or fix errors associated with some software components. Further, automatically or externally generated software components may be abundant in some programs, which may cause an undesirable amount of monitoring overhead for an APM system. As another example, the one or more predefined rules may be used to determine whether the stack elements indicate that corresponding software components include one or more language porting scripts that execute programs written in other programming languages, because, in some cases, a system used by the recipient of the list of identified back-end components may be unable to monitor specific actions performed by the programs. Accordingly, the one or more predefined rules may be one or more automatically or externally generated software component identification rules, one or more language porting detection rules, or one or more other rules. The one or more predefined rules may be stored at computer system 102 of FIG. 1 or at another computing device (e.g., accessible via socket(s) 116).

Figure 4A:
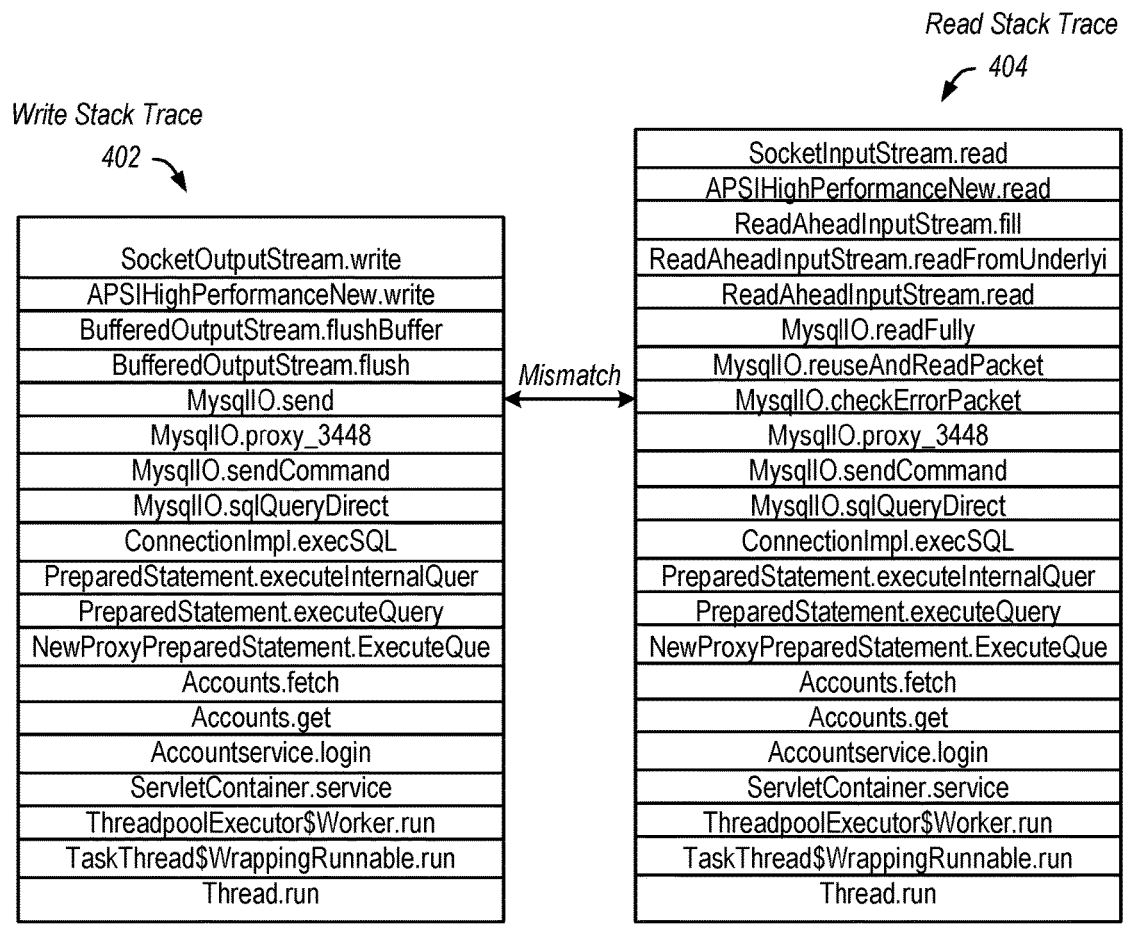

Turning now to FIGS. 4A-B, a block diagram illustrating an example examination of stack traces is shown. In particular, a write stack trace 402, a read stack trace 404, and a merged stack trace 406 are shown. In the illustrated embodiment, write stack trace 402 includes a request for a write operation at (a request for data to be stored at) an external system and read stack trace 404 includes a request for a read operation at (a request for data to be retrieved from) the external system. Merged stack trace 406 is included for explanatory purposes and, in the illustrated embodiment, may not be generated. However, in other embodiments, merged stack trace 406 may be generated.

As discussed above with reference to FIG. 3, back-end components may be identified by identifying a software component corresponding to a closest common ancestor between a write stack trace and a read stack trace of a transaction. In FIG. 4A, the stack elements below MysqlIO.send in write stack trace 402 and MysqlIO.checkErrorPacket in read stack trace 404, respectively, are common to both stack traces. For illustrative purposes, this difference is labeled "mismatch" in FIGS. 4A-B and the common stack elements are merged in FIG. 4B. In this example, a process of identifying a closest common ancestor involves identifying a software component corresponding to a last stack element common to both of the stack traces prior to the mismatch. Accordingly, in FIGS. 4A-B, MysqlIO.proxy_3448 may be identified. In some embodiments, the closest common ancestor may correspond to a software component that triggers the write request and the read request.

As discussed above with reference to FIG. 3, in some embodiments, an identified software component may be validated against one or more predefined rules. For example, in the illustrated embodiment, a software component corresponding to MysqlIO.proxy_3448 may have been automatically or externally generated. The identified software component may be bypassed and a different software component may be identified as the back-end component. The different software component may correspond to a closest common ancestor stack element that does not indicate a violation of the one or more predefined rules. In the illustrated example, the closest common ancestor stack element may be MysqlIO.sendCommand. Accordingly, a software component corresponding to MysqlIO.sendCommand may be identified as a back-end component. In other embodiments, a software component corresponding to MysqlIO.proxy_3448 may not violate one or more predefined rules and may not be bypassed.

Figure 5:
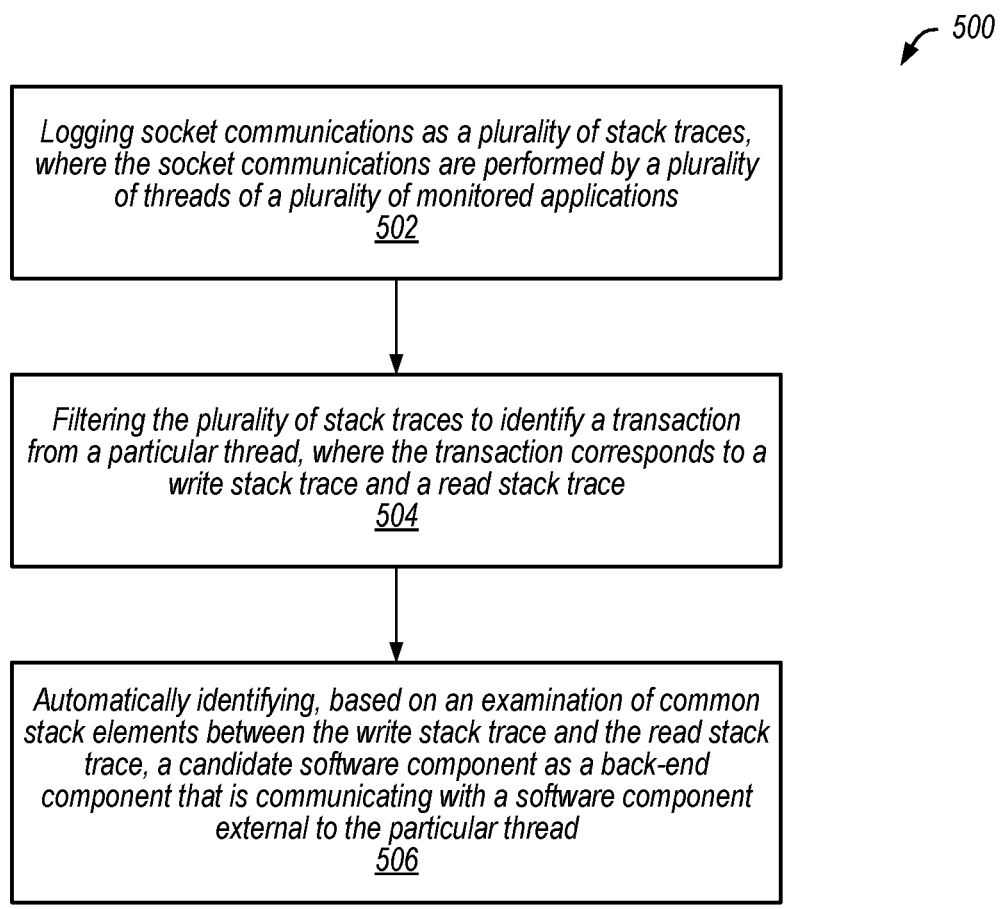
FIG. 5 is a flow diagram illustrating one embodiment of a method of identifying a back-end component.

Referring now to FIG. 5, a flow diagram of a method 500 of identifying a back-end component is depicted. In some embodiments, method 500 may be initiated or performed by one or more processors in response to one or more instructions stored by a computer-readable storage medium.

At 502, method 500 includes logging socket communications as a plurality of stack traces, where the socket communications are performed by a plurality of threads of a plurality of monitored applications. For example, method 500 may include stack trace recorder 112 logging communications of software components 110*a-n* via socket(s) 116.

At 504, method 500 includes filtering the plurality of stack traces to identify a transaction from a particular thread, where the transaction includes a write stack trace and a read stack trace. For example, method 500 may include back-end component identifier 114 filtering the plurality of thread stack traces 204, 208 to identify identified stack traces 304*a-n*.

At 506, method 500 includes automatically identifying, based on an examination of common stack elements between the write stack trace and the read stack trace, a candidate software component as a back-end component that is communicating with a software component external to the particular thread. For example, method 500 may include back-end component identifier 114 comparing write stack trace 402 and read stack trace 404 to identify a software component corresponding to MysqlIO.proxy_3448 as a back-end component. Accordingly, a method of identifying a back-end component is depicted.

Figure 6:
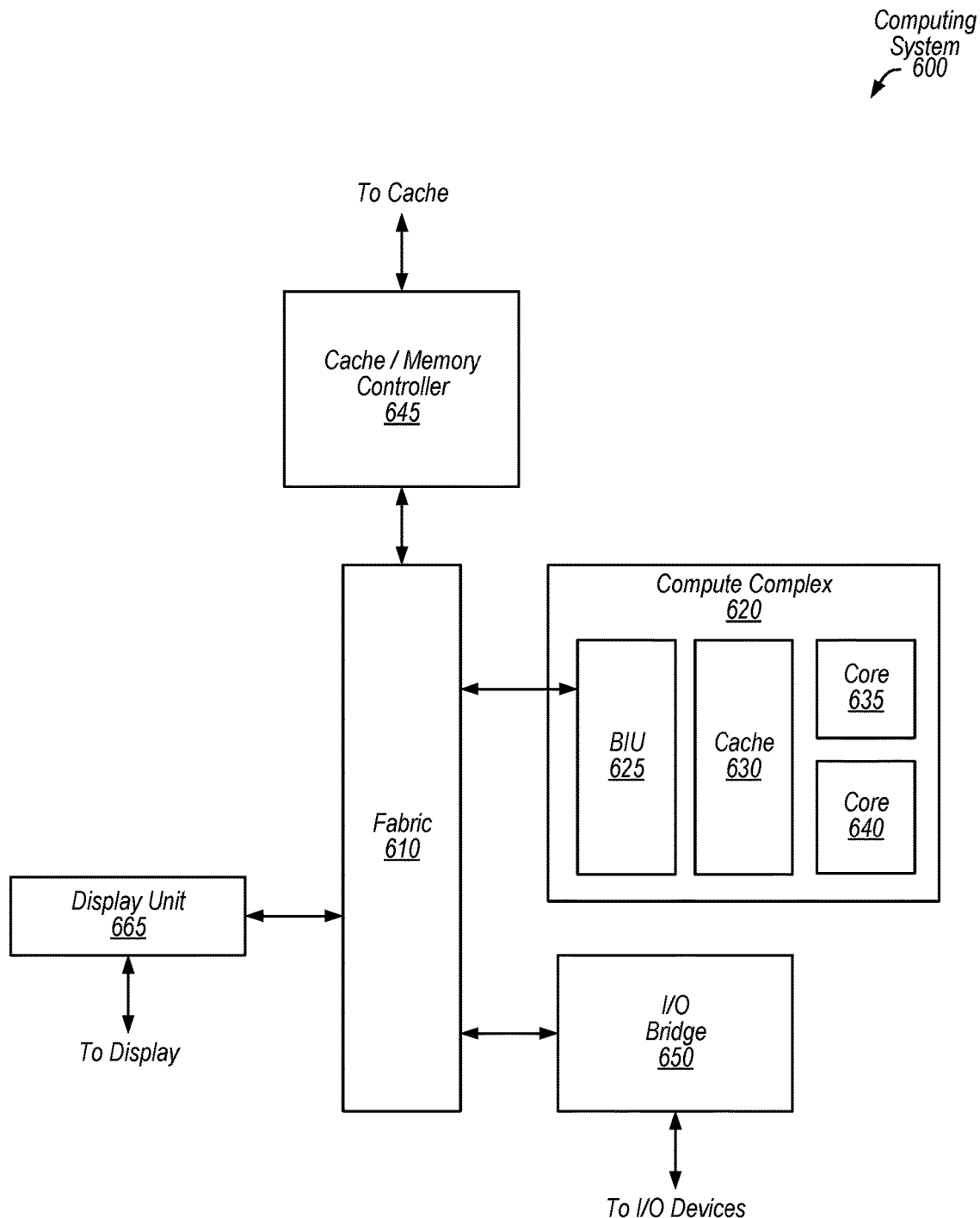
FIG. 6 is block diagram illustrating an embodiment of a computing system that includes at least a portion of a back-end component identification system.

Turning next to FIG. 6, a block diagram illustrating an exemplary embodiment of a computing system 600 that includes at least a portion of a back-end component identification system. In some embodiments, computing system 600 includes or corresponds to computing system 102 of FIG. 1, including any variations or modifications described previously with reference to FIGS. 1-5. In some embodiments, some or all elements of the computing system 600 may be included within a system on a chip (SoC). In some embodiments, computing system 600 is included in a mobile device. In the illustrated embodiment, the computing system 600 includes fabric 610, compute complex 620, input/output (I/O) bridge 650, cache/memory controller 645, and display unit 665.

Fabric 610 may include various interconnects, buses, MUXes, controllers, etc., and may be configured to facilitate communication between various elements of computing system 600. In some embodiments, portions of fabric 610 are configured to implement various different communication protocols. In other embodiments, fabric 610 implements a single communication protocol and elements coupled to fabric 610 may convert from the single communication protocol to other communication protocols internally. In some embodiments, communications via fabric 610 may be performed via socket(s) 116.

In the illustrated embodiment, compute complex 620 includes bus interface unit (BIU) 625, cache 630, and cores 635 and 640. In some embodiments, cores 635 and 640 may implement various applications or software components described herein, such as applications 106*a-n*, software components 110*a-n*, stack trace recorder 112, or back-end component identifier 114. In various embodiments, compute complex 620 includes various numbers of cores and/or caches. For example, compute complex 620 may include 1, 2, or 4 processor cores, or any other suitable number. In some embodiments, cores 635 and/or 640 include internal instruction and/or data caches. In some embodiments, a coherency unit (not shown) in fabric 610, cache 630, or elsewhere in computing system 600 is configured to maintain coherency between various caches of computing system 600. BIU 625 may be configured to manage communication between compute complex 620 and other elements of computing system 600. Processor cores such as cores 635 and 640 may be configured to execute instructions of a particular instruction set architecture (ISA), which may include operating system instructions and user application instructions.

Cache/memory controller 645 may be configured to manage transfer of data between fabric 610 and one or more caches and/or memories (e.g., non-transitory computer readable mediums). For example, cache/memory controller 645 may be coupled to an L3 cache, which may, in turn, be coupled to a system memory. In other embodiments, cache/memory controller 645 is directly coupled to a memory. In some embodiments, the cache/memory controller 645 includes one or more internal caches. In some embodiments, the cache/memory controller 645 may include or be coupled to one or more caches and/or memories that include instructions that, when executed by one or more processors (e.g., compute complex 620), cause the processor, processors, or cores to initiate or perform some or all of the processes described above with reference to FIGS. 1-5.

As used herein, the term "coupled to" may indicate one or more connections between elements, and a coupling may include intervening elements. For example, in FIG. 6, display unit 665 may be described as "coupled to" compute complex 620 through fabric 610. In contrast, in the illustrated embodiment of FIG. 6, display unit 665 is "directly coupled" to fabric 610 because there are no intervening elements.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 600 via I/O bridge 650. In some embodiments, communications via I/O bridge 650 may be performed via socket(s) 116.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having program instructions stored thereon that, when executed by a computing device, cause the computing device to perform operations comprising:
    logging socket communications by a particular thread of a monitored application to generate a plurality of separate stack traces for the particular thread, wherein the plurality of separate stack traces include indications of software components of the particular thread, and wherein the plurality of separate stack traces include a write stack trace corresponding to a write operation that sends a data request to a software component external to the monitored application and a read stack trace corresponding to a read operation that obtains data from the external software component for the data request; and
    automatically identifying, based on an examination of common stack elements common between the write stack trace and the read stack trace, a candidate software component of the monitored application as a back-end component that is communicating, by performing the write operation followed by the read operation, with the external software component, wherein the candidate software component corresponds to a stack element common between the write stack trace and the read stack trace.

2. The non-transitory computer-readable medium of claim 1, wherein the operations further comprise, in response to automatically identifying the candidate software component as the back-end component, monitoring a timing of execution of at least one process of the back-end component.

3. The non-transitory computer-readable medium of claim 2, wherein the operations further comprise determining, based on the timing of execution of at least one process of the back-end component, whether the back-end component is causing an error of the monitored application.

4. The non-transitory computer-readable medium of claim 1, wherein identifying the candidate software component as the back-end component comprises identifying a closest common ancestor stack element of the write stack trace and the read stack trace.

5. The non-transitory computer-readable medium of claim 4, wherein identifying the candidate software component as the back-end component further comprises validating a software component corresponding to the closest common ancestor stack element against one or more predefined rules.

6. The non-transitory computer-readable medium of claim 5, wherein the software component corresponding to the closest common ancestor stack element is the candidate software component, and wherein the candidate software component satisfies the one or more predefined rules.

7. The non-transitory computer-readable medium of claim 5, wherein identifying the candidate software component as the back-end component comprises, in response to the software component corresponding to the closest common ancestor stack element failing to satisfy at least one of the one or more predefined rules, identifying a next closest common ancestor stack element of the write stack trace and the read stack trace.

8. The non-transitory computer-readable medium of claim 5, wherein the one or more predefined rules include one or more automatically or externally generated software component identification rules.

9. The non-transitory computer-readable medium of claim 5, wherein the one or more predefined rules include one or more language porting detection rules.

10. A method, comprising:
    logging socket communications as a plurality of separate stack traces, wherein the socket communications are performed by a plurality of threads of a plurality of monitored applications;
    filtering the plurality of separate stack traces to identify a transaction from a particular thread, wherein the transaction corresponds to:
        a write stack trace corresponding to a write operation that sends a data request to a software component external to the particular thread; and
        a separate read stack trace corresponding to a read operation that obtains data from the external software component for the data request; and
    automatically identify, based on examination of stack elements common between the write stack trace and the read stack trace, a candidate software component of a monitored application associated with the particular thread as a back-end component that is communicating with the external software component, wherein the candidate software component corresponds to a stack element common between the write stack trace and the read stack trace.

11. The method of claim 10, further comprising, in response to automatically identifying the candidate software component as the back-end component, monitoring a timing of execution of the back-end component.

12. The method of claim 10, wherein logging the socket communications comprises:
    identifying a subset of threads using one or more sockets by the plurality of monitored applications; and
    logging socket communications of the subset of threads.

13. The method of claim 10, wherein logging the socket communications comprises identifying communications using one or more sockets in a client context.

14. The method of claim 10, wherein identifying the candidate software component as the back-end component comprises bypassing one or more other candidate software components of the write stack trace and the read stack trace in response to the one or more other candidate software components failing to meet one or more predefined rules.

15. The method of claim 10, wherein the transaction corresponds to a plurality of stack traces other than the write stack trace and the read stack trace.

16. The method of claim 10, wherein the particular thread includes a plurality of transactions including the transaction.

17. A system, comprising:
a processor; and
a non-transitory memory having instructions stored thereon that, when executed by the processor, cause the processor to perform operations comprising:
- logging socket communications by a particular thread of a monitored application to generate a plurality of separate stack traces corresponding to the particular thread, wherein the plurality of separate stack traces include indications of software components of the particular thread;
- identifying, from the plurality of separate stack traces, a write stack trace corresponding to a write operation that sends a request for data to a software component external to the monitored application and a separate read stack trace corresponding to a read operation that retrieves the data from the external software component for the request; and
- automatically identifying, based on an examination of common stack elements between the write stack trace and the read stack trace, a candidate software component as a back-end component that is communicating with the external software component by performing the write operation followed by the read operation, wherein the candidate software component corresponds to a stack element common between the write stack trace and the read stack trace.

18. The system of claim 17, wherein the operations further comprise, in response to identifying an error of the monitored application, determining whether the candidate software component is causing the error based on automatically identifying the candidate software component as the back-end component.

* * * * *